April 5, 1949.  G. W. JOHNSON  2,466,242
POULTRY PICKING MACHINE
Filed March 17, 1945  4 Sheets-Sheet 1

INVENTOR,
Gordon W. Johnson.
BY
Roy E. Hamilton,
Attorney.

April 5, 1949.  G. W. JOHNSON  2,466,242
POULTRY PICKING MACHINE
Filed March 17, 1945  4 Sheets-Sheet 2

INVENTOR,
Gordon W. Johnson.
BY
Roy E. Hamilton,
Attorney.

April 5, 1949.  G. W. JOHNSON  2,466,242
POULTRY PICKING MACHINE
Filed March 17, 1945  4 Sheets-Sheet 3

INVENTOR,
Gordon W. Johnson.
BY
Roy E. Hamilton,
Attorney.

April 5, 1949.  G. W. JOHNSON  2,466,242
POULTRY PICKING MACHINE
Filed March 17, 1945  4 Sheets-Sheet 4
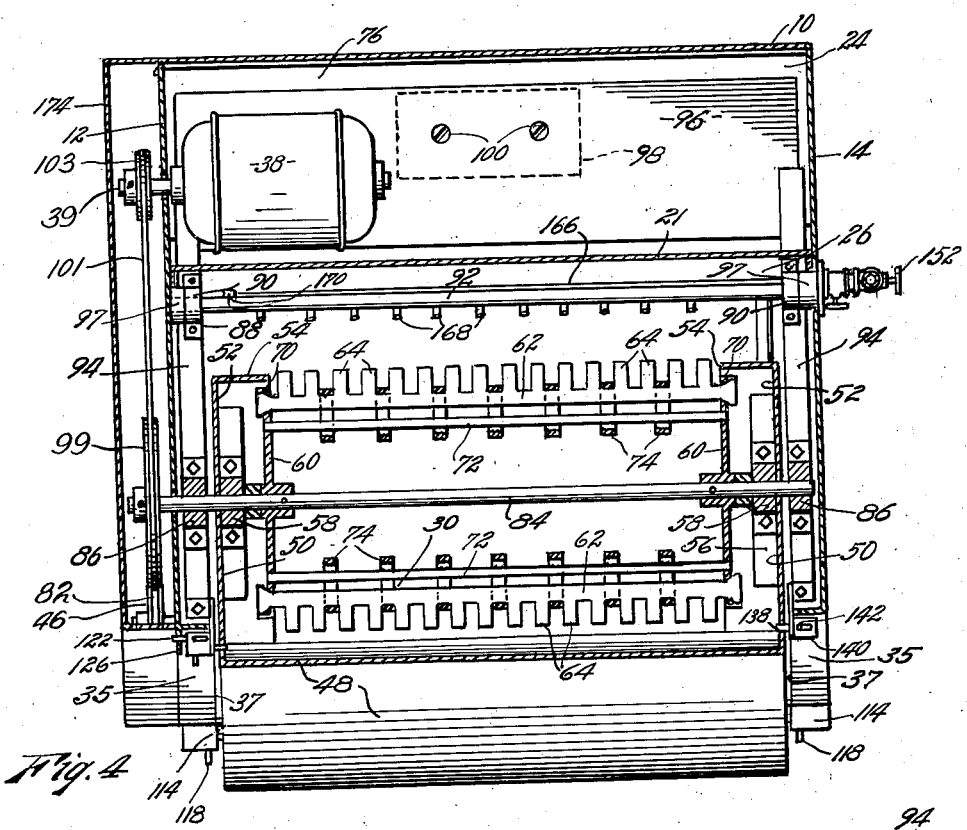
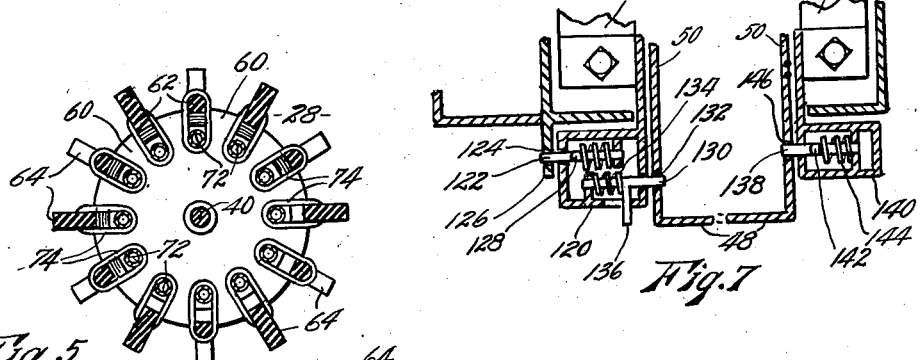
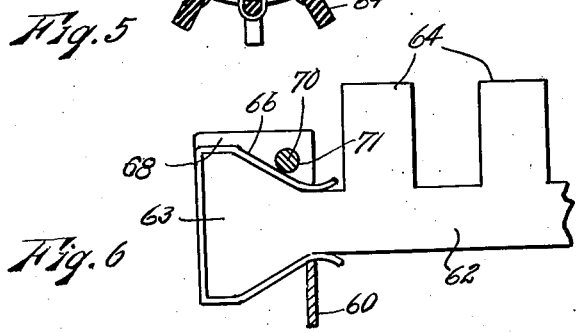
INVENTOR,
Gordon W. Johnson.
BY
Roy E. Hamilton,
Attorney.

Patented Apr. 5, 1949

2,466,242

UNITED STATES PATENT OFFICE 2,466,242

POULTRY PICKING MACHINE

Gordon W. Johnson, Raytown, Mo., assignor to Gordon Johnson Company, Kansas City, Mo., a corporation of Missouri Application March 17, 1945, Serial No. 583,206

7 Claims. (Cl. 17—11.1)

This invention relates to poultry picking machines and has particular reference to a poultry picking machine of the double drum type wherein the fowl or parts thereof are introduced between the pair of rotating feather engaging drums.

The principal object of the present invention is the provision of a poultry picking machine having a pair of oppositely rotated picking drums or strippers partially shielded to present a slot therebetween through which parts of the fowl are introduced for positioning between said rotatable drums.

Another object of the present invention is the provision of a cabinet carrying a rotatable picking drum mounted in bearings stationary in said cabinet and a rotatably mounted picking drum adjustable toward and from said first named drum.

Another object of the present invention is the provision of a poultry picking machine having a pair of cooperating rotatable members, each having a pair of spaced apart axially disposed members, a series of elastic members disposed in spaced relation under tension between said axially disposed members, each of said elastic members having feather engaging studs and means to limit the outward movement of said elastic members due to centrifugal force.

Other objects are economy and rigidity of construction, adaptability for picking the extremities of the fowl and simplicity and ease of operation.

With these objects in view, as well as other objects which will appear during the course of the specification, reference will be had to the drawings wherein:

Fig. 4 is a cross sectional view taken on line IV—IV of Fig. 2 with some parts omitted and some parts left in elevation.

Fig. 5 is a cross sectional view of one of the feather engaging drums with the feather engaging lugs extended.

Fig. 6 is an enlarged fragmentary sectional view showing the end portion of the elastic picking bar and associated parts.

Fig. 7 is an enlarged foreshortened sectional view taken on line VI—VI of Fig. 9.

Figure 1:
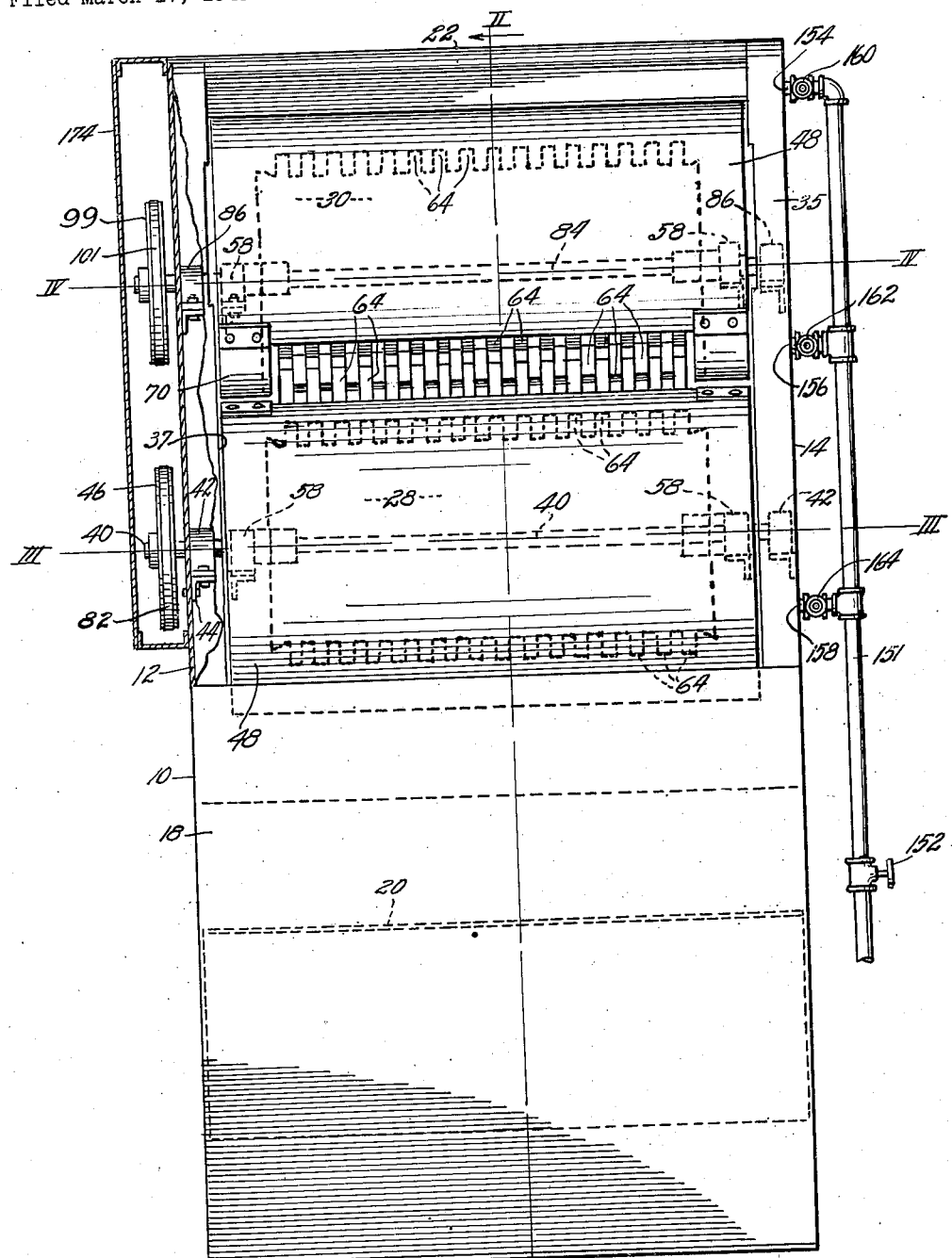
Fig. 1 is a front elevation of a fowl plucking machine partly in section and partly in dotted lines embodying this invention.

Throughout the several views like reference characters refer to similar parts and the numeral 10 designates a cabinet comprising end walls 12 and 14, back wall 16, and front wall 18. A bottom member 20 extends downwardly and rearwardly from front wall 18 to meet the rear wall 16 adjacent the bottom of the cabinet. A vertically disposed transverse partition 21 extends downwardly from the top 22 of the cabinet to a point spaced apart from the inclined bottom 20. This partition is spaced apart from the back wall 16 to form a motor compartment 24 which is separated from the forward compartment 26 which contains the feather picking drums 28 and 30. The upper portion of the rear of the cabinet is provided with an upper hinged closure member 32 and a lower hinged closure member 34. These are adapted to be open for access to the motors 36 and 38 which drive drums 28 and 30 respectively. The upper front portion of the cabinet is inclined upwardly and rearwardly as clearly shown in Fig. 2 at 35 to provide for the proper positioning of the feather engaging drums in the opening 37 formed therein.

Lower drum 28 is mounted on shaft 40 for rotation therewith and this shaft is mounted in bearings 42 disposed at opposite ends of the cabinet on angle ledges 44 which are secured to the respective ends 12 and 14.

One end of shaft 40 extends through the end cabinet wall 12 and is provided with a grooved belt wheel 46. Mounted on shaft 40 within compartment 26 is a drum housing 48 which spans picker drum 28 lengthwise and is substantially semi-cylindrical to normally cover the forward side of the picker drum. This drum housing is provided with end walls 50 which are reduced at their one side at 52 to receive end bands 54. Each end wall 50 is provided with an angled ledge 56 on which is mounted bearings 58 for concentrically supporting housing 48 for rotatable adjustment on shaft 40.

The picker or stripping drum 28 comprises two end disks 60 spaced apart and securely attached to shaft 40 for rotation therewith. A series of elastic bars 62 secured at their opposite ends respectively to said disks are preferably equally spaced about the periphery of said disks and in parallel relation with shaft 40. Each bar 62 is provided with a series of spaced apart feather engaging lugs 64. The lugs of adjacent bars are disposed in offset relation in such a manner as to insure substantially complete contact of the fowl's body. Each enlarged end 63 of the bar 62 is preferably provided with a metal fitting or clip 66 which rigidly engages the end of the bar and provides means whereby the bar is secured between a pair of lips 68 integral with disks 60. When the clip 66 is positioned, a pin 70 is positioned through openings 71 in lips 68 to secure the clip in position. In radial alignment with each of the bars 62 and spaced inwardly therefrom is a tube 72 disposed parallel with shaft 40. A pliable band 74 encompasses tube 72 and the adjacent bar 62 to limit the outward travel of the elastic bars due to centrifugal force when the drum is rotated. These bands are located in spaced apart relation, as clearly shown, so as to insure a substantially cylindrical form to the contour of the outer ends of the feather engaging lugs 64 during the picking operation. It will be noted that these bands extend about the bar 62 between the lugs which tend to retain them in the proper spaced relation. These bands are preferably pliable but not elastic so as to provide a definite limit to the outward movement of said bars. This drum is adapted to be driven by stationary motor 36 which is mounted on shelf 76 securely mounted within compartment 24. The motor shaft 78 extends through end wall 12 and is provided with a grooved pulley wheel 80. A belt 82 operatively interconnects belt wheels 46 and 80 to drive the picker drum 28.

Picker drum 30 is constructed in like manner as drum 28 and the parts are numbered in like manner. This drum 30 is mounted for rotation with shaft 84 which in turn is mounted in bearings 86 carried by the frame 88 which in turn is oscillatably mounted in bearings 97 carried respectively by end walls 12 and 14. The cross bar 96 of frame 88 serves as a support for motor 38 and serves to join together the side arms 94 of frame 88. A counterweight 98 secured by screws 100 to the underside of cross bar 96 is of proper weight to substantially balance the drum 30 and motor 38 on the shaft 92. Since the motor shaft 39 of motor 38 and the drum shaft 84 are adjustable about the shaft 92, it is necessary to slot end wall at 93 and 95 to respectively receive the extended ends of the drum shaft 84 and motor shaft 39. The end portion of shaft 84 extends beyond wall 12 and is provided with a securely mounted belt wheel 99 which is operatively interconnected by a belt 101 with a belt wheel 103 secured to motor shaft 95.

Figure 2:
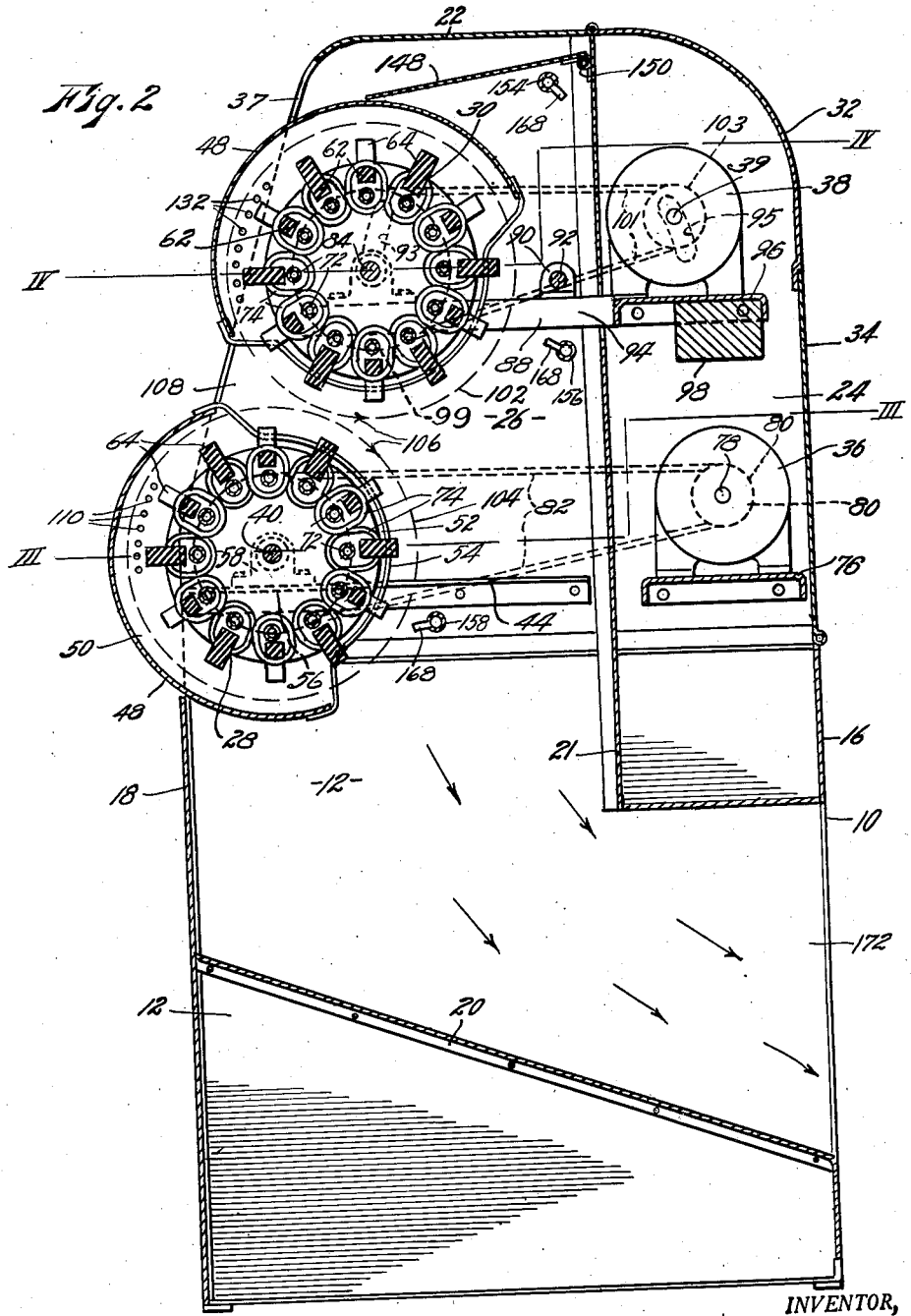
Fig. 2 is a vertical sectional view taken on line II—II of Fig. 1.
Figure 3:
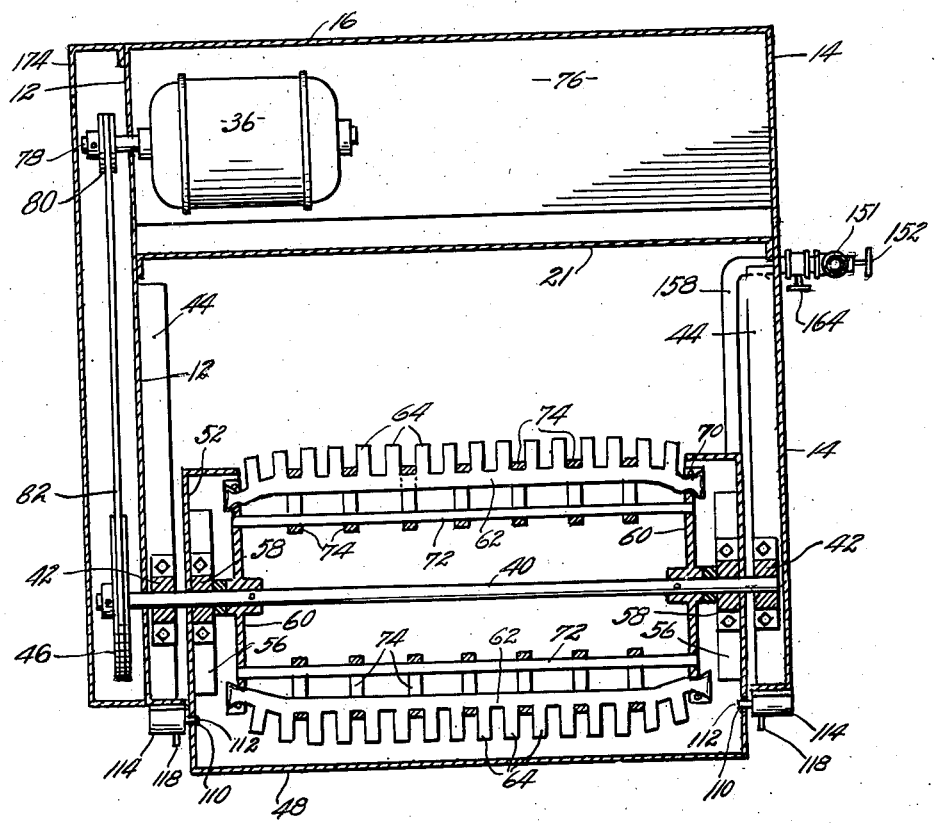
Fig. 3 is a cross sectional view taken on line III—III of Fig. 2 with the feather engaging members extended by centrifugal force during the picking operation with some parts omitted and with other parts left in elevation.

When the parts are at rest as shown in Fig. 2, the elastic bars 62 will be disposed in a straight line and the feather engaging lugs 64 of the drums 28 and 30 will be spaced apart as shown. Furthermore, the bands 74 will be inactive. However, when the motors are energized to drive the drums at the proper picking speed or speeds, the outer extremities of the feather engaging lugs 64 will be extended to the dotted lines 102 and 104 so that the distance therebetween will be greatly reduced. The arrows 106 in lines 102 and 104, indicate the direction of rotation of the respective drums. A cross section of one of the picking drums, shown in Fig. 5, shows the position of the parts when the drum is rotating at a sufficient speed to set up centrifugal force to move the feather engaging lugs to the picking position.

Figures 8, 9, 10:
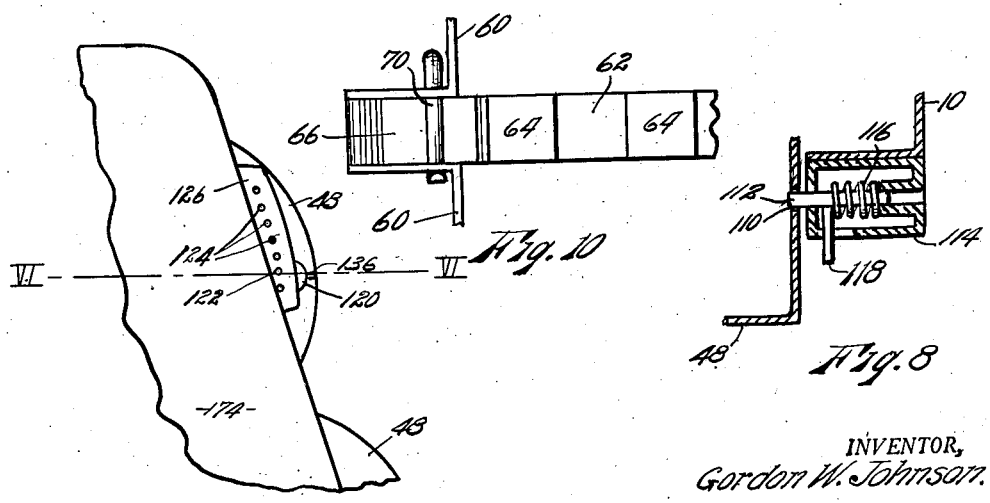
Fig. 8 is an enlarged sectional view of one of the lower latch members.
Fig. 9 is a fragmentary elevational view showing the upper drum housing in two different positions.
Fig. 10 is a plan view of the elastic picking bar and associated parts shown in Fig. 6.

It is quite apparent that when the parts of the fowl are introduced between the drums, the feather engaging lugs may be depressed by overcoming the centrifugal action, thus making it possible to contact the irregular contour of the fowl part being picked. Each of the drums is provided with a housing 48 and these housings are spaced apart at 108, the proper distance to admit the legs, wings or neck of the fowl, but to preclude the passage of the fowl's body therebetween. While this positioning of the housings is shown in Figs. 1 and 2, however, provision is made for adjusting the housings so that full access may be had to the drums to carry on any of the usual picking operations. These housings 48 are provided with latching means whereby they may be secured in any desired position relative to the cabinet. The housing for picking drum 28 is provided with an arcuate series of holes 110 in each of its ends which are adapted to be engaged by the latch pin 112 of latch member 114. This pin 112 is normally urged to the extended position by means of a spring 116 which rests against the upper operating handle 118 as clearly shown in Fig. 8.

By engaging operating handles 118 to release the pins 112, the operator can move housing 48 to the desired position and then drop the pins into one of the holes in series 110. The oscillatable drum 30, is provided with a double latch member 120 as shown in Fig. 7. This latch member is provided with a latch pin 122 which engages one of the holes of the arcuate series of holes 124 formed in a flange 126 extending outwardly from the front of the cabinet 10. This latch pin 122 is provided with an operating arm 128. The latch member is carried by the side arm 94 and maintains a constant position relative to the shaft 84, thus making it possible to oscillate the frame 88 on shaft 92 to adjust the drum 30 toward and from drum 28. This latch member is also provided with a latch pin 130 which engages one of the holes 132 of an arcuate series of holes 134 formed in the end wall of housing 48. This pin 130 is urged to the extended position by means of spring 134 and has an operating arm 136. At the opposite side of this housing 48 is a latch pin 138 mounted in latch housing 140 carried by the side arm 94. This latch pin has an operating arm 142 and is urged by spring 144 to engage in a hole 146 of a series of arcuate disposed holes formed in the end wall of housing 48.

To prevent objectionable leakage between the upper housing 48 and the cabinet 10 through opening 37, a floating closure member 148 hinged at 150 to partition 21 rests on top of housing 48 at all times.

A water line 151 interconnected with a suitable supply of water under pressure is controlled by valve 152 and has transverse spray members 154, 156 and 158 which are controlled by valves 160, 162 and 164 respectively and extend through end wall 14 to reach substantially across the cabinet. The spray members each comprise an elongated tubular member 166 having a series of transverse spray members 168. The end of member 166 is capped at 170 so that all water delivered to the spray members will be forced laterally therefrom through the nozzles. Spray member 154 is positioned to discharge jets of water against the partition member 21, spray member 156 sprays water upwardly against drum 30 and spray member 158 projects water against the lower portion of drum 28. All water delivered to the cabinet is drained to the inclined bottom 20 and to the back of the machine. The desired amount of water to the various parts of the machine may be regulated by means of the control valves described above. Feathers plucked from the fowl will pass downwardly and through the opening 172 formed through the back of the machine.

A removable housing 174 is secured to the end wall 12 of the cabinet to cover the moving parts which extend beyond said end wall.

Having thus described my invention, what I claim as new and desire to secure by Letters Patent is:

1. A fowl plucking machine comprising a housing having a front opening and an outlet, a feather engaging drum mounted for rotation in said housing adjacent said front opening, a feather engaging drum rotatably mounted in said housing for transverse adjustment toward and from said first named drum, a drum housing mounted for angular adjustment on the axis of each of said drums adjustable to form an opening therebetween to receive a fowl for positioning between the adjacent portions of the peripheries of said drums, and means to simultaneously rotate said drums in opposite directions.

2. A fowl plucking machine comprising a housing, a pair of horizontally disposed feather engaging drums mounted for rotation in said housing, means adjustable to transversely adjust one of said drums whereby the distance between the peripheries of said drums is varied, and a series of elastic members disposed in spaced apart relation under tension on the periphery of each of said drums, said elastic members having feather engaging edges adapted to contact and pluck feathers from the fowl carcass positioned between said drums as the machine is operated.

3. A fowl plucking machine comprising a housing, a pair of horizontally disposed feather engaging drums mounted for rotation in said housing, means adjustable to transversely adjust one of said drums whereby the distance between the peripheries of said drums is varied, a pair of shields mounted for adjustment about the respective axes of said drums to regulate the amount of the exposed areas of said drums, and a series of elastic members disposed in spaced apart relation under tension on the periphery of each of said drums, said elastic members having feather engaging edges adapted to contact and pluck feathers from the fowl carcass positioned between said drums as the machine is operated.

4. In a fowl plucking machine, a rotatably mounted member having a pair of spaced apart, axially disposed members; a series of elastic members disposed in spaced apart relation under tension between said axially disposed members, said elastic members having feather engaging edges adapted to engage and pluck feathers from a fowl carcass as the said machine is operated; and a series of members associated with each of said elastic members to limit the outward movement of the elastic member due to centrifugal force.

5. In a fowl plucking machine, a rotatably mounted member having a pair of spaced apart, axially disposed members; a series of elastic members disposed in spaced apart relation under tension between said axially disposed members, said elastic members having feather engaging edges adapted to engage and pluck feathers from a fowl carcass as the said machine is operated; a tube secured at its opposite ends to said axially disposed members adjacent each of said elastic members; and a series of spaced apart bands encompassing said tube and the adjacent elastic member whereby to limit the radial movement of said elastic members due to centrifugal force, as the rotatably mounted member is rotated.

6. In a fowl plucking machine, a pair of horizontally disposed rotatable feather engaging drums each having a series of elastic feather engaging bars at its periphery; means to relatively adjust the said drums whereby the distance between the adjacent peripheries thereof is varied; means to simultaneously drive said drums in opposite directions; and means to limit the outward movement of said feather engaging bars due to centrifugal force as the drums are rotated.

7. In a fowl plucking machine, a pair of horizontally disposed rotatable feather engaging drums each having a series of elastic feather engaging bars at its periphery; means to relatively adjust the said drums whereby the distance between the adjacent peripheries thereof is varied; means to simultaneously drive said drums in opposite directions; means to limit the outward movement of said feather engaging bars due to centrifugal force as the drums are rotated; and an adjustable housing for each drum whereby the working periphery thereof is partially shielded.

GORDON W. JOHNSON.

REFERENCES CITED

The following references are of record in the file of this patent:

UNITED STATES PATENTS

| Number | Name | Date |
| --- | --- | --- |
| 1,737,225 | Dunner | Nov. 26, 1929 |
| 2,334,714 | Knight | Nov. 21, 1941 |